US012050417B2

(12) United States Patent
Furukawa et al.

(10) Patent No.: US 12,050,417 B2
(45) Date of Patent: Jul. 30, 2024

(54) TRANSFER DEVICE AND IMAGE FORMING APPARATUS

(71) Applicant: FUJIFILM Business Innovation Corp., Tokyo (JP)

(72) Inventors: Masato Furukawa, Kanagawa (JP); Shogo Hayashi, Kanagawa (JP); Satoya Sugiura, Kanagawa (JP); Makoto Ochiai, Kanagawa (JP); Minoru Rokutan, Kanagawa (JP); Takuro Hoshio, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/189,209

(22) Filed: Mar. 24, 2023

(65) Prior Publication Data

US 2024/0094663 A1 Mar. 21, 2024

(30) Foreign Application Priority Data

Sep. 1, 2022 (JP) ................................ 2022-139519

(51) Int. Cl.
*G03G 15/16* (2006.01)

(52) U.S. Cl.
CPC .................................. *G03G 15/162* (2013.01)

(58) Field of Classification Search
CPC .................................................... G03G 15/162
See application file for complete search history.

(56) References Cited

U.S. PATENT DOCUMENTS

| | | | | |
|---|---|---|---|---|
| 10,108,132 | B2 | 10/2018 | Kawanago | |
| 2012/0034479 | A1 | 2/2012 | Kimpara et al. | |
| 2017/0003623 | A1* | 1/2017 | Noguchi | G03G 15/234 |
| 2017/0139355 | A1* | 5/2017 | Yoshida | G03G 15/162 |

FOREIGN PATENT DOCUMENTS

| | | |
|---|---|---|
| JP | 2012037725 | 2/2012 |
| JP | 2017126017 | 7/2017 |
| JP | 2018040862 | 3/2018 |

* cited by examiner

*Primary Examiner* — Stephanie E Bloss
*Assistant Examiner* — Michael A Harrison
(74) *Attorney, Agent, or Firm* — JCIPRNET

(57) ABSTRACT

A transfer device includes an intermediate transfer belt that has an outer peripheral surface to which a toner image is to be transferred, a primary transfer device that has a primary transfer member performing primary transfer of a toner image formed on a surface of an image holder to the outer peripheral surface of the intermediate transfer belt, and a secondary transfer device that has a secondary transfer belt arranged in contact with the outer peripheral surface of the intermediate transfer belt and performing secondary transfer of the toner image transferred to the outer peripheral surface of the intermediate transfer belt to a surface of a recording medium, in which the intermediate transfer belt has an indentation modulus A of 5,000 MPa or more, and the secondary transfer belt has an indentation modulus B of 300 MPa or less and a tensile modulus C of 250 MPa or more.

16 Claims, 2 Drawing Sheets

TRANSFER DEVICE AND IMAGE FORMING APPARATUS

CROSS-REFERENCE TO RELATED APPLICATIONS

This application is based on and claims priority under 35 USC 119 from Japanese Patent Application No. 2022-139519 filed Sep. 1, 2022.

BACKGROUND

(i) Technical Field

The present invention relates to a transfer device and an image forming apparatus.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium so that an image is formed. For the transfer of the toner image to the recording medium, for example, a conductive endless belt such as an intermediate transfer belt is used.

For example, JP2017-126017A discloses "a resin belt containing at least polyimide and carbon black, in which a heat of fusion of 15 mJ/mg or more and 25 mJ/mg or less is detected from the resin belt in a temperature range of 250° C. or higher and 350° C. or lower by thermal analysis performed using a differential scanning calorimeter, a mixing amount of the carbon black is 5 to 20 parts by mass with respect to 100 parts by mass of the polyimide, an average thickness of the resin belt is 40 to 120 μm, a Martens hardness of the resin belt is 120 N/mm 2 or more and 280 N/mm 2 or less, and a modulus of elasticity of the resin belt that is measured by the method of testing tensile properties specified in JIS K7127 is 1,500 Mpa or more and 2,500 MPa or less".

JP2018-040862A discloses "an image forming apparatus that forms an image by transferring a toner image formed on an image holder onto a transfer target, the image forming apparatus including a cleaning unit having a rigid metal blade that comes into contact with the image holder after the toner image is transferred onto the transfer target to clean off residues having adhered to a surface of the image holder, in which the image holder has a substrate layer and an elastic layer, a surface hardness of the elastic layer measured by a nanoindentation method is 70 MPa or more and 150 MPa or less, and a thickness of the rigid blade is 100 μm or more and 300 μm or less".

JP2012-037725A discloses "an endless belt for an electrophotographic instrument provided with an elastic layer formed on a surface of a substrate layer by using a rubber composition obtained by mixing a rubber material with an inorganic filler, in which a mass fraction of all organic components in the elastic layer is 40% to 75%, and a product P of an indentation modulus (Mpa) α of the elastic layer and a braking strain (%) β of the elastic layer is in a range of 6,000 to 50,000".

SUMMARY

In the related art, a transfer device including an intermediate transfer belt that has an outer peripheral surface to which a toner image is to be transferred, a primary transfer device that has a primary transfer member performing primary transfer of a toner image formed on a surface of an image holder to the outer peripheral surface of the intermediate transfer belt, and a secondary transfer device that has a secondary transfer belt arranged in contact with the outer peripheral surface of the intermediate transfer belt and performing secondary transfer of the toner image transferred to the outer peripheral surface of the intermediate transfer belt to a surface of a recording medium tends to easily cause contamination of the back surface of the recording medium by the long-term use.

Aspects of non-limiting embodiments of the present disclosure relate to a transfer device that further suppresses the contamination of the back surface of a recording medium, compared to "the aforementioned transfer device in which the secondary transfer belt has an indentation modulus more than 300 MPa or has a tensile modulus C less than 250 MPa" or "the aforementioned transfer device in which a difference between an indentation modulus A (MPa) of the intermediate transfer belt and an indentation modulus B (MPa) of the secondary transfer belt (A-B) is less than 5,000 MPa".

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The above aspect is achieved by the following means.

According to an aspect of the present disclosure, there is provided a transfer device including:

- an intermediate transfer belt that has an outer peripheral surface to which a toner image is to be transferred;
- a primary transfer device that has a primary transfer member performing primary transfer of a toner image formed on a surface of an image holder to the outer peripheral surface of the intermediate transfer belt; and
- a secondary transfer device that has a secondary transfer belt arranged in contact with the outer peripheral surface of the intermediate transfer belt and performing secondary transfer of the toner image transferred to the outer peripheral surface of the intermediate transfer belt to a surface of a recording medium,
- in which the intermediate transfer belt has an indentation modulus A of 5,000 MPa or more, and
- the secondary transfer belt has an indentation modulus B of 300 MPa or less and a tensile modulus C of 250 MPa or more.

BRIEF DESCRIPTION OF THE DRAWINGS

Exemplary embodiment(s) of the present invention will be described in detail based on the following figures, wherein.

DETAILED DESCRIPTION

Figure 1:
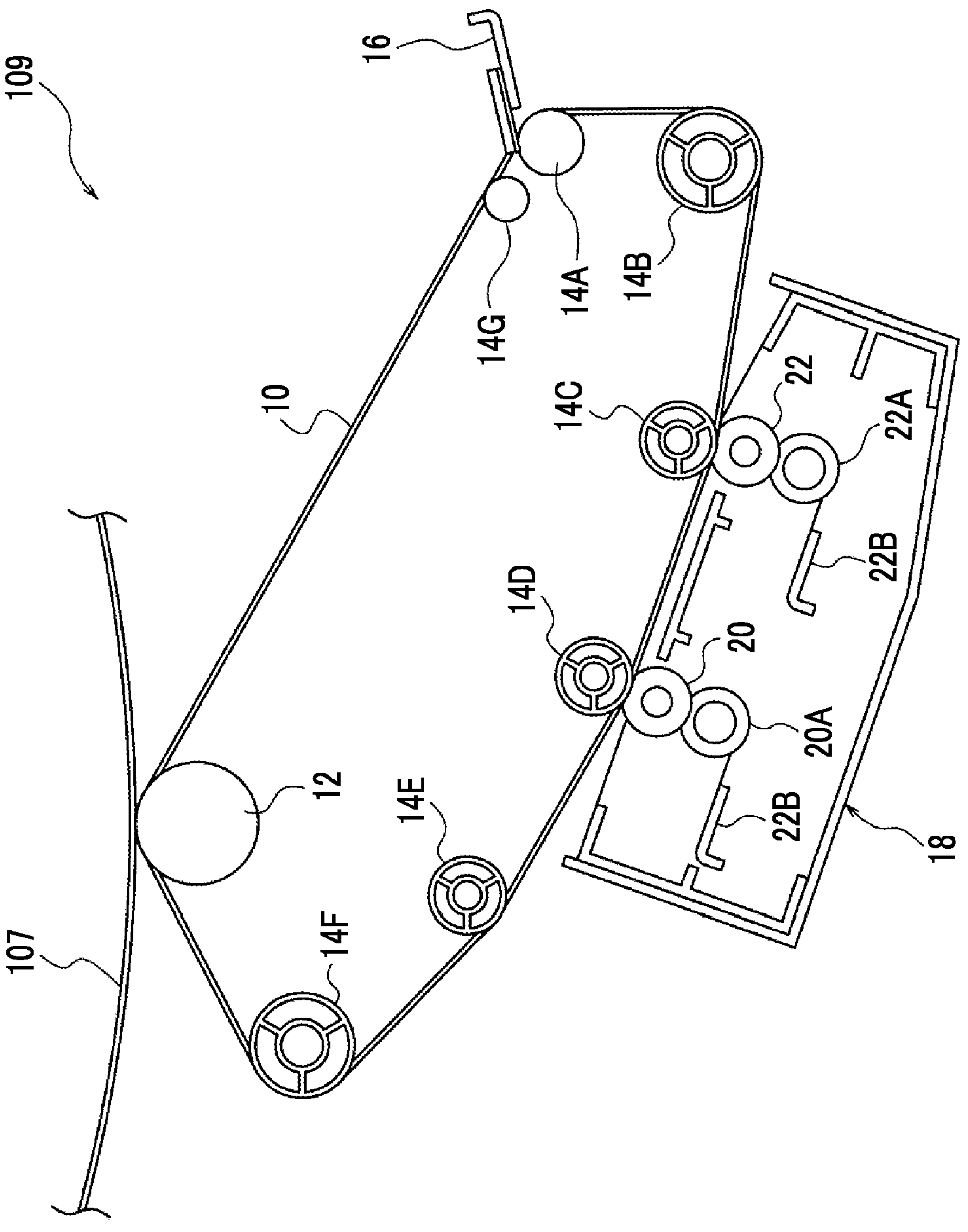
FIG. 1 is a schematic configuration view showing an example of a secondary transfer device according to the present exemplary embodiment.

The exemplary embodiments of the present exemplary embodiment will be described below. The following descriptions and examples merely illustrate exemplary embodiments, and do not limit the scope of the exemplary embodiments.

Regarding the ranges of numerical values described in stages in the present exemplary embodiment, the upper limit or lower limit of a range of numerical values may be replaced with the upper limit or lower limit of another range of numerical values described in stages. Furthermore, in the present exemplary embodiment, the upper limit or lower limit of a range of numerical values may be replaced with values described in examples.

In the present exemplary embodiment, the term "step" includes not only an independent step but a step that is not clearly distinguished from other steps as long as the intended goal of the step is achieved.

In the present exemplary embodiment, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present exemplary embodiment, each component may include a plurality of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Transfer Device

A transfer device according to a first exemplary embodiment includes an intermediate transfer belt that has an outer peripheral surface to which a toner image is to be transferred, a primary transfer device that has a primary transfer member performing primary transfer of a toner image formed on a surface of an image holder to the outer peripheral surface of the intermediate transfer belt, and a secondary transfer device that has a secondary transfer belt that is arranged in contact with the outer peripheral surface of the intermediate transfer belt and performs secondary transfer of the toner image transferred to the outer peripheral surface of the intermediate transfer belt to a surface of a recording medium, in which the intermediate transfer belt has an indentation modulus A of 5,000 MPa or more, and the secondary transfer belt has an indentation modulus B of 300 MPa or less and a tensile modulus C of 250 MPa or more.

A transfer device according to a second exemplary embodiment includes an intermediate transfer belt that has an outer peripheral surface to which a toner image is to be transferred, a primary transfer device that has a primary transfer member performing primary transfer of a toner image formed on a surface of an image holder to the outer peripheral surface of the intermediate transfer belt, and a secondary transfer device that has a secondary transfer belt that is arranged in contact with the outer peripheral surface of the intermediate transfer belt and performs secondary transfer of the toner image transferred to the outer peripheral surface of the intermediate transfer belt to a surface of a recording medium, in which the secondary transfer belt has a tensile modulus C of 250 MPa or more, an indentation modulus A (MPa) of the secondary transfer belt is larger than an indentation modulus B (MPa) of the secondary transfer belt, and a difference between the indentation modulus A and the indentation modulus B (A-B) is 5,000 MPa or more and 7,500 MPa or less.

Hereinafter, the configuration common to the first and second exemplary embodiments will be called "the present exemplary embodiment".

Hereinafter, a transfer device including an intermediate transfer belt that has an outer peripheral surface to which a toner image is to be transferred, a primary transfer device that has a primary transfer member performing primary transfer of a toner image formed on a surface of an image holder to the outer peripheral surface of the intermediate transfer belt, and a secondary transfer device that has a secondary transfer belt that is arranged in contact with the outer peripheral surface of the intermediate transfer belt and performs secondary transfer of the toner image transferred to the outer peripheral surface of the intermediate transfer belt to a surface of a recording medium will be also called "specific transfer device".

In the related art, in a case where a toner is accumulated on a belt constituting a transfer unit, due to the contact between the belt and a cleaning member such as a cleaning blade or the rub of a counterpart member or paper against the belt in a transfer step, the toner is crushed, and sticking of the toner to the belt surface (so-called filming) occurs. In a case where images are continuously formed thereafter, the toner is not cleaned off from the site of filming on the surface of the endless belt and remains on the surface of the endless belt, and cleaning failure occurs. In a case where the phenomenon of toner filming occurs on the secondary transfer belt, the back surface of a recording medium (a surface opposite to a surface on which an image is formed) tends to be contaminated.

On the other hand, having the above configuration, the transfer device according to the present exemplary embodiment suppresses the contamination of the back surface of a recording medium in a case where the transfer device is mounted on an image forming apparatus, even though images are repeatedly formed. The mechanism of action thereof is unclear, but is assumed to be as follows.

In the transfer device according to the first exemplary embodiment, the intermediate transfer belt has an indentation modulus A of 5,000 MPa or more, and the secondary transfer belt has an indentation modulus B of 300 MPa or less and a tensile modulus C of 250 MPa or more.

In the transfer device according to the second exemplary embodiment, the secondary transfer belt has a tensile modulus C of 250 MPa or more, the indentation modulus A (MPa) of the intermediate transfer belt is larger than the indentation modulus B (MPa) of the secondary transfer belt, and a difference between the indentation modulus A and the indentation modulus B (A-B) is 5,000 MPa or more and 7,500 MPa or less.

As described above, in the transfer device according to the present exemplary embodiment, the indentation modulus of the outer peripheral surface of the secondary transfer belt is smaller than the indentation modulus of the outer peripheral surface of the intermediate transfer belt. Therefore, in a case where the relatively hard intermediate transfer belt comes into contact with the relatively soft secondary transfer belt that is easily deformed, the stress applied to the toner can be reduced. Accordingly, the occurrence of the filming phenomenon is suppressed, and the contamination of the back surface of a recording medium is suppressed even though images are repeatedly formed.

Hereinafter, the transfer device according to the present exemplary embodiment will be specifically described.

Transfer Device

The transfer device according to the present exemplary embodiment includes an intermediate transfer belt that has an outer peripheral surface to which a toner image is to be transferred, a primary transfer device that has a primary transfer member performing primary transfer of a toner image formed on a surface of an image holder to the outer peripheral surface of the intermediate transfer belt, and a secondary transfer device that has a secondary transfer belt that is arranged in contact with the outer peripheral surface of the intermediate transfer belt and performs secondary transfer of the toner image transferred to the outer peripheral surface of the intermediate transfer belt to a surface of a recording medium.

Characteristics of Transfer Device

Indentation Modulus A of Intermediate Transfer Belt

In the transfer device according to the first exemplary embodiment, the indentation modulus A of the intermediate transfer belt is 5,000 MPa or more. The indentation modulus A is, for example, preferably 5,000 MPa or more and 8,000 MPa or less, and more preferably 5,000 MPa or more and 6,700 MPa or less.

In the transfer device according to the second exemplary embodiment, the indentation modulus A of the intermediate transfer belt is, for example, preferably 5,000 MPa or more, more preferably 5,000 MPa or more and 8,000 MPa or less, and even more preferably 5,000 MPa or more and 6,700 MPa or less.

The indentation modulus refers to an index showing the degree of hardness of a region about several μm below the outer peripheral surface side of the surface layer of each belt in a thickness direction. The larger the indentation modulus, the softer the outer peripheral surface of the belt, which shows that the belt is easily deformed.

In a case where the indentation modulus A is 5,000 MPa or more and 7,000 MPa or less, when the intermediate transfer belt comes into contact with an intermediate transfer belt-cleaning member such as a cleaning blade, the deformation of the surface of the intermediate transfer belt is suppressed, and the intermediate transfer belt is likely to stably come into contact with the blade. Therefore, toner slipping or the like is likely to be suppressed, and the contamination of the surface of the intermediate transfer belt is further suppressed. As a result, even in a case where images are repeatedly formed, the contamination of the back surface of a recording medium is further suppressed.

Furthermore, in a case where the indentation modulus A is 7,000 MPa or less, the stress that is applied to the surface layer of the intermediate transfer belt when the intermediate transfer belt comes into contact with the secondary transfer belt is inhibited from excessively increasing. Therefore, the intermediate transfer belt exhibits excellent breaking durability.

The indentation modulus A of the intermediate transfer belt is measured as follows.

The intermediate transfer belt is cut along the thickness direction from the outer peripheral surface side to obtain a test piece having a size of 200 μm (thickness)×20 mm (length)×20 mm (width). This sample is subjected to the indentation test specified in ISO 14577-1 "Metallic materials—Instrumented indentation test for hardness and materials parameters—Part 1: Test method". By using the obtained results, the indentation modulus A is calculated based on "A.5 Indentation modulus EIT" in Annex A of ISO 14577-1.

There is no particular limit on the method of setting the indentation modulus A of the intermediate transfer belt to be within the above range. Examples thereof include a method of configuring the intermediate transfer belt such that the intermediate transfer belt includes a substrate layer containing a hard thermosetting resin such as polyimide, a method of providing a hard coat layer such as a glass coating material on the surface of the intermediate transfer belt, a method of modifying the surface of the intermediate transfer belt by ultraviolet irradiation, and the like.

Indentation Modulus B of Secondary Transfer Belt

In the transfer device according to the first exemplary embodiment, the indentation modulus B of the secondary transfer belt is 300 MPa or less. The indentation modulus B is, for example, preferably 10 MPa or more and 300 MPa or less, more preferably 10 MPa or more and 200 MPa or less, and even more preferably 10 MPa or more and 100 MPa or less.

In the transfer device according to the second exemplary embodiment, the indentation modulus B of the secondary transfer belt is, for example, preferably 300 MPa or less, more preferably 10 MPa or more and 300 MPa or less, even more preferably 10 MPa or more and 200 MPa or less, and particularly preferably 10 MPa or more and 100 MPa or less.

In a case where the indentation modulus B is 300 MPa or less, the stress that is applied when the secondary transfer belt comes into contact with the intermediate transfer belt is likely to be dispersed on the surface layer of the secondary transfer belt. Therefore, the force that is applied as contact pressure to the toner of a non-image region in a secondary transfer portion is inhibited from excessively increasing, and the filming phenomenon is less likely to occur.

In a case where the indentation modulus B is 10 MPa or more, when the secondary transfer belt comes into contact with the intermediate transfer belt, the surface layer of the secondary transfer belt is inhibited from being excessively deformed. Therefore, the secondary transfer belt is likely to stably come into contact with the cleaning blade, toner slipping or the like is likely to be suppressed, and the contamination of the back surface of a recording medium is further suppressed even in a case where images are repeatedly formed.

There is no particular limit on the method of setting the indentation modulus B to be within the above range. Examples thereof include a method of providing an elastic layer containing a thermoplastic elastomer on the secondary transfer belt.

The indentation modulus B of the secondary transfer belt can be obtained by the same method as the indentation modulus A of the intermediate transfer belt.

In the transfer device according to the first exemplary embodiment, for example, it is preferable that the indentation modulus A (MPa) of the intermediate transfer belt be larger the indentation modulus B (MPa) of the secondary transfer belt. The difference between the indentation modulus A and the indentation modulus B (A-B) is, for example, more preferably 5,000 MPa or more and 7,500 MPa or less, even more preferably 5,800 MPa or more and 7,000 MPa or less, and particularly preferably 5,850 MPa or more and 6,500 MPa or less.

In the transfer device according to the second exemplary embodiment, for example, the indentation modulus A (MPa) of the intermediate transfer belt is larger the indentation modulus B (MPa) of the secondary transfer belt. The difference between the indentation modulus A and the indentation modulus B (A-B) is 5,000 MPa or more and 7,500 MPa or less. The difference (A-B) is, for example, preferably 5,800 MPa or more and 7,000 MPa or less, and more preferably 5,850 MPa or more and 6,500 MPa or less.

In a case where the difference between the indentation modulus A and the indentation modulus B (A-B) is 7,500 MPa or less, when the secondary transfer belt comes into contact with the intermediate transfer belt, the surface layer of the secondary transfer belt is inhibited from being excessively deformed. Therefore, the secondary transfer belt is likely to stably come into contact with the cleaning blade, toner slipping or the like is likely to be suppressed, and the contamination of the back surface of a recording medium is further suppressed even in a case where images are repeatedly formed.

In a case where the difference between the indentation modulus A and the indentation modulus B (A-B) is 5,000 MPa or more, the stress that is applied when the secondary transfer belt comes into contact with the intermediate transfer belt is likely to be dispersed on the surface layer of the secondary transfer belt. Therefore, the force that is applied as contact pressure to the toner of a non-image region in a secondary transfer portion is inhibited from excessively increasing, and the filming phenomenon is less likely to occur.

There is no particular limit on the method of setting the difference between the indentation modulus A and the indentation modulus B (A-B) to be within the above range. Examples thereof include a method of providing an elastic layer containing a thermoplastic elastomer on the secondary transfer belt, and the like.

Tensile Modulus C

In the transfer device according to the present exemplary embodiment, the tensile modulus C of the secondary transfer belt is 250 MPa or more. The tensile modulus C is, for example, preferably 250 MPa or more and 3,000 MPa or less, and more preferably 260 MPa or more and 2,000 MPa or less.

The tensile modulus refers to a tensile modulus in a circumferential direction measured based on JIS K7127.

In a case where the tensile modulus C is 250 MPa or more and 3,000 MPa or less, deformation that occurs in a case where tension required for driving the belt is applied is suppressed, which makes it possible to drive the belt with high stability. Therefore, the secondary transfer belt is likely to be stably come into contact with the cleaning blade, and even in a case where images are repeatedly formed, the contamination of the back surface of a recording medium is further reduced.

Furthermore, in a case where the tensile modulus C is 3,000 MPa or less, a phenomenon where the entire secondary transfer belt excessively hardens and thus the surface layer of the belt or the like cracks is likely to be suppressed, and excellent breaking durability is obtained.

The tensile modulus C of the secondary transfer belt is measured as follows based on JIS K7127. Specifically, the tensile modulus C is a value obtained by preparing a test piece (width 5 mm) punched with No. 3 dumbbell and measuring a tensile modulus at a tensile rate of 20 mm/min by using MODEL-1605N manufactured by Aikoh Engineering Co., Ltd.

There is no particular limit on the method of setting the tensile modulus C of the secondary transfer belt to be within the above range. Examples thereof include a method of providing a soft thermoplastic resin on the substrate layer of the secondary transfer belt, a method of providing an elastic layer containing a thermoplastic elastomer, a method of laminating layers having different moduli of elasticity, and the like.

Intermediate Transfer Belt

Layer Configuration

A toner image is transferred to the outer peripheral surface of the intermediate transfer belt.

The layer configuration of the intermediate transfer belt is not particularly limited as long as the indentation modulus A is within the aforementioned range. The intermediate transfer belt may be a single layer consisting of a substrate layer or a laminate including a substrate layer.

Examples of the laminate including a substrate layer include a laminate in which an elastic layer is provided on the outer peripheral surface of a substrate layer, a laminate in which a resin layer is provided on the inner peripheral surface of a substrate layer, and a laminate in which an elastic layer and a resin layer are provided on the outer peripheral surface of a substrate layer and on the inner peripheral surface of the substrate layer respectively.

As the elastic layer provided on the outer peripheral surface of a substrate layer and the resin layer provided on the inner peripheral surface of the substrate layer, known layers adopted for the intermediate transfer belt are used.

Substrate Layer

The substrate layer contains, for example, a resin and a conducting agent. As necessary, the substrate layer may contain other known components. The substrate layer may be configured to contain rubber (for example, acrylic rubber) instead of a resin.

Resin

Examples of the resin include a polyimide resin (hereinafter, also simply called polyimide), a polyamide-imide resin (hereinafter, also simply called polyamide-imide), an aromatic polyether ketone resin (for example, an aromatic polyether ether ketone resin or the like), a polyphenylene sulfide resin (PPS resin), and a polyetherimide resin (PEI resin), a polyester resin, a polyamide resin, a polycarbonate resin, and the like.

From the viewpoint of mechanical strength and dispersibility of the conducting agent, for example, the resin preferably includes at least one resin selected from the group consisting of a polyester resin, a polyimide resin, and a polyamide-imide resin, and more preferably includes at least one of a polyimide resin or a polyamide-imide resin.

Examples of the polyimide resin include an imidized polyamic acid (polyimide resin precursor) that is a polymer of a tetracarboxylic acid dianhydride and a diamine compound.

Examples of the polyimide resin include a resin having a constitutional unit represented by General Formula (I).

General Formula (I)

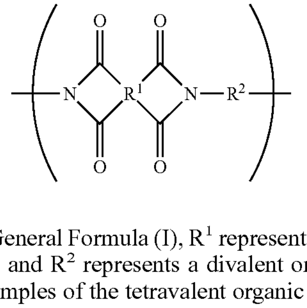

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic acid dianhydride that will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these. Specific examples of the divalent organic group include a residue of a diamine compound that will be described later.

Specifically, examples of the tetracarboxylic acid dianhydride used as a raw material of the polyimide resin include a pyromellitic acid dianhydride, a 3,3',4,4'-benzophenone tetracarboxylic acid dianhydride, a 3,3',4,4'-biphenyltetracarboxylic acid dianhydride, a 2,3,3',4-biphenyltetracarboxylic acid dianhydride, a 2,3,6,7-naphthalenetetracarboxylic acid dianhydride, a 1,2,5,6-naphthalenetetracarboxylic acid dianhydride, a 1,4,5,8-naphthalenetetracarboxylic acid dianhydride, a 2,2'-bis(3,4-dicarboxyphenyl)sulfonic acid dianhydride, a perylene-3,4,9,10-Tetracarboxylic acid dianhydride, a bis(3,4-dicarboxyphenyl)ether dianhydride, and an ethylenetetracarboxylic acid dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl)toluene, bis(p-β-amino-tert-butylphenyl)ether, bis(p-β-methyl-δ-aminophenyl) benzene, bis-p-(1,1-dimethyl-5-amino-pentyl) benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylenediamine, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

Examples of the polyamide-imide resin include a resin having an imide bond and an amide bond in a repeating unit.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof preferable. In addition to the tricarboxylic acid, a tetracarboxylic acid dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

For example, it is preferable that the outer peripheral surface, to which a toner image is to be transferred, of the intermediate transfer belt be configured to contain polyimide. In a case where the outer peripheral surface is configured to contain polyimide, when the intermediate transfer belt and the cleaning blade come into contact with each other, excessive deformation of the intermediate transfer belt is likely to be suppressed, toner slipping or the like is likely to be suppressed, and the contamination of the surface of the intermediate transfer belt is further reduced even though images are repeatedly formed. In addition, excellent transferability is obtained.

From the viewpoint of mechanical strength, volume resistivity adjustment, and the like, the content of the resin with respect to the substrate layer is, for example, preferably 60% by mass or more and 95% by mass or less, more preferably 70% by mass or more and 95% by mass or less, and even more preferably 75% by mass or more and 90% by mass or less.

Conducting Agent

Examples of the conducting agent include conductive particles (for example, particles having a volume resistivity less than $10^7$ Ω·cm, the same applies hereinafter) and semiconductive particles (for example, particles having a volume resistivity of $10^7$ Ω·cm or more and $10^{13}$ Ω·cm or less, the same applies hereinafter).

Specifically, the conducting agent is not particularly limited, and examples thereof include carbon black, a metal (for example, aluminum, nickel, or the like), a metal oxide (for example, yttrium oxide, tin oxide, or the like), an ion conducting substance (for example, potassium titanate, LiCl, or the like), and the like.

The conducting agent is selected depending on the intended use thereof. For example, carbon black is preferable.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

From the viewpoint of dispersibility, mechanical strength, volume resistivity, film forming properties, and the like, the average particle size of the carbon black is, for example, preferably 2 nm or more and 40 nm or less, more preferably 8 nm or more and 25 nm or less, and even more preferably 10 nm or more and 15 nm or less.

The average particle size of the conducting agent (particularly carbon black) is measured by the following method.

First, by a microtome, a measurement sample having a thickness of 100 nm is collected from the substrate layer and observed with a transmission electron microscope (TEM). Then, the diameters of circles each having an area equivalent to the projected area of each of 50 conducting agents (that is, equivalent circle diameters) are adopted as particle sizes, and the average thereof are adopted as the average particle size.

From the viewpoint of mechanical strength, volume resistivity, and the like, the content of the conducting agent with respect to the substrate layer is, for example, preferably 10% by mass or more and 50% by mass or less, more preferably 12% by mass or more and 40% by mass or less, and even more preferably 15% by mass or more and 30% by mass or less.

Other Components

Examples of other components include a filler for improving mechanical strength, an antioxidant for preventing thermal deterioration of a belt, a surfactant for improving fluidity, a heat-resistant antioxidant, and the like.

In a case where the substrate layer contains other components, the content of the other components with respect to the substrate layer is, for example, preferably more than 0% by mass and 10% by mass or less, more preferably more than 0% by mass and 5% by mass or less, and even more preferably more than 0% by mass and 1% by mass or less.

Volume Resistivity of Intermediate Transfer Belt

From the viewpoint of transferability, the common logarithm of the volume resistivity that the intermediate transfer belt has in a case where a voltage of 500 V is applied thereto for 10 seconds is, for example, 7.0 (log Ω·cm) or more and 13.5 (log Ω·cm) or less, more preferably 8.5 (log Ω·cm) or more and 13.2 (log Ω·cm) or less, and particularly preferably 10.0 (log Ω·cm) or more and 12.5 (log Ω·cm) or less.

The volume resistivity that the intermediate transfer belt has in a case where a voltage of 500 V is applied thereto for 10 seconds is measured by the following method.

By using a microammeter (5450 manufactured by ADC CORPORATION) as a resistance meter and a UR probe (manufactured by Mitsubishi Chemical Analytech Co., Ltd.) as a probe, the volume resistivity (log Ω·cm) is measured at a total of 18 spots in the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The volume resistivity is measured in an environment of a temperature of 22° C. and a humidity of 55% RH.

Surface Resistivity of Intermediate Transfer Belt

From the viewpoint of transferability to embossed paper, the common logarithm of the surface resistivity that the intermediate transfer belt has in a case where a voltage of 500 V is applied to the outer peripheral surface thereof for 10 seconds is, for example, preferably 10.0 (log Ω/suq.) or more 15.0 (log Ω/suq.) or less, more preferably 10.5 (log Ω/suq.) or more and 14.0 (log Ω/suq.) or less, and particularly preferably 11.0 (log Ω/suq.) or more and 13.5 (log Ω/suq.) or less.

The unit of the surface resistivity, log Ω/suq, expresses the surface resistivity in a logarithm of resistance per unit area, which is also written as log(Ω/suq.), Log Ω/square, log Ω/□, or the like.

The surface resistivity that the intermediate transfer belt has in a case where a voltage of 500 V is applied to the outer peripheral surface thereof for 10 seconds is measured by the following method.

By using a microammeter (5450 manufactured by ADC CORPORATION) as a resistance meter and a UR probe (manufactured by Mitsubishi Chemical Analytech Co., Ltd.) as a probe, the surface resistivity (log Ω/suq.) of the outer peripheral surface of the endless belt is measured at a total of 18 spots within the outer peripheral surface of the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

In a step of preparing a belt body, a known manufacturing method of an intermediate transfer belt is used to obtain the belt body.

Film thickness of intermediate transfer belt

In a case where the intermediate transfer belt is a single layer, from the viewpoint of mechanical strength of the belt, the thickness of the intermediate transfer belt is, for example, preferably 60 μm or more and 120 μm or less, and more preferably 70 μm or more and 120 μm or less.

In a case where the intermediate transfer belt is a laminate consisting of a substrate layer and a surface layer, from the viewpoint of manufacturing suitability and from the viewpoint of suppressing discharge, the thickness of the substrate layer is, for example, preferably 10 μm or more and 100 μm or less, and more preferably 30 μm or more and 80 μm or less.

In a case where the intermediate transfer belt is a laminate consisting of a substrate layer and a surface layer, the thickness of the surface layer is, for example, preferably 1 μm or more and 80 μm or less, and more preferably 20 μm or more and 40 μm or less. In a case where the thickness of the surface layer is within the above range, the contact pressure is likely to be reduced even though the intermediate transfer belt comes into contact with the secondary transfer belt. Therefore, even in a case where images are repeatedly formed, the contamination of the back surface of a recording medium is further reduced. Furthermore, it is considered that the intermediate transfer belt may also have excellent breaking durability.

The film thickness is measured as follows.

By using an optical microscope or a scanning electron microscope, the cross section of the intermediate transfer belt in the thickness direction is observed at 10 random sites within a layer as a measurement target, and the film thickness is measured. An arithmetic mean of the obtained film thicknesses is calculated and adopted as the thickness of each layer.

Primary Transfer Device

In the primary transfer device, the primary transfer member that performs primary transfer of the toner image formed on the surface of the image holder to the outer peripheral surface of the intermediate transfer belt is arranged to face the image holder across the intermediate transfer belt. In the primary transfer device, by the primary transfer member, a voltage with polarity opposite to charging polarity of a toner is applied to the intermediate transfer belt, such that primary transfer of a toner image to the outer peripheral surface of the intermediate transfer belt is performed.

The primary transfer member may be a primary transfer roll or a primary transfer belt.

Secondary Transfer Device

The secondary transfer device has a secondary transfer belt that is arranged in contact with the outer peripheral surface of the intermediate transfer belt and performs secondary transfer of the toner image transferred to the outer peripheral surface of the intermediate transfer belt to a surface of a recording medium.

The secondary transfer device may include, for example, a secondary transfer belt and a back surface member that is arranged on the side opposite to the toner image-holding side of the intermediate transfer belt.

In the secondary transfer device, the intermediate transfer belt and the recording medium are interposed between the secondary transfer belt and the back surface member, and a transfer electric field is formed. In this way, secondary transfer of the toner image on the intermediate transfer belt to the recording medium is performed. As the back surface member, for example, a back roll is used.

The transfer device according to the present exemplary embodiment may be a transfer device that transfers a toner image to the surface of a recording medium via a plurality of intermediate transfer belts. That is, the transfer device may be, for example, a transfer device of performing primary transfer of a toner image to a first intermediate transfer belt from an image holder, performing secondary transfer of the toner image to a second intermediate transfer belt from the first intermediate transfer belt, and then performing tertiary transfer of the toner image to a recording medium from the second intermediate transfer belt. The first intermediate transfer belt may be a first intermediate transfer roll or a first intermediate transfer belt.

In a case where the transfer device includes a plurality of intermediate transfer belts, as the intermediate transfer belt that transfers the toner image to a recording medium (the secondary intermediate transfer belt described above), at least the secondary transfer belt of the first exemplary embodiment or the secondary transfer belt of the second exemplary embodiment is used.

Hereinafter, an example of the secondary transfer device of the present application will be described with reference to a drawing. However, the secondary transfer device is not limited to the following configuration as long as the indentation modulus B and the tensile modulus C are within the ranges described above. As the secondary transfer device, known belt-type secondary transfer devices are adopted.

FIG. 1 is a schematic configuration view showing an example of a secondary transfer device according to the present exemplary embodiment.

As shown in FIG. 1, for example, a secondary transfer device 109 includes a secondary transfer belt 10 (secondary transfer belt according to the present exemplary embodiment) that is arranged in contact with the outer peripheral surface of an intermediate transfer belt 107, a secondary transfer roll 12 that is arranged to come into contact with the inner peripheral surface of the secondary transfer belt 10 and face the intermediate transfer belt 107 across the secondary transfer belt 10, and one support roll or a plurality of support rolls 14A to 14F (six support rolls 14A to 14F in the present exemplary embodiment) that is arranged to come into contact with the inner peripheral surface of the secondary transfer belt 10 and supports the secondary transfer belt in corporation with the secondary transfer rolls in a state where tension is applied to the secondary transfer belt.

The layer structure of the secondary transfer roll 12 is not particularly limited. For example, in a case where the layer structure is a triple layer structure, the secondary transfer roll 12 is configured with a core layer, an interlayer, and a coating layer that coats the surface of the interlayer. The core layer is configured with a foamed substance in which a conducting agent such as conductive particles are dispersed, such as silicone rubber, urethane rubber, or EPDM. The interlayer is configured with a non-foamed substance of the above materials. Examples of the material of the coating layer include a tetrafluoroethylene-hexafluoropropylene copolymer, a perfluoroalkoxy resin, and the like. The volume resistivity of the secondary transfer roll 12 is, for example, preferably $10^7$ Ωcm or less. The secondary transfer roll 12 may also have a double layer structure devoid of an interlayer.

On the outer peripheral surface of the secondary transfer belt 10, there is provided a scraping jig 16 (scraper: an example of cleaning device) that scrapes off an attachment (such as a toner) on the outer peripheral surface of the secondary transfer belt 10, the scraping jig 16 being located on the downstream side of the secondary transfer roll 12 in the rotation direction of the belt to face the support roll 14A (roll functioning as an opposing roll of the scraping jig) across the secondary transfer belt 10.

On the upstream side of the scraping jig 16 in the rotation direction of the belt, there is provided a leveling roll 14G that pushes up the secondary transfer belt 10 to the outer peripheral surface side from the inner peripheral surface side such that the scraping jig 16 is leveled.

On the outer peripheral surface of the secondary transfer belt 10, there is provided an electrostatic cleaner 18 (an example of cleaning device) that electrostatically removes an attachment (such as a toner) on the outer peripheral surface of the secondary transfer belt 10, the electrostatic cleaner 18 being located on the downstream side of the scraping jig 16 in the rotation direction of the belt.

The electrostatic cleaner 18 includes, for example, two electrostatic brushes 20 and 22 that come into contact with the secondary transfer belt 10 and electrostatically remove an attachment (such as a toner), two collecting rollers 20A and 22A that collect an attachment (such as a toner) having adhered to the electrostatic brushes 20 and 22 while rotating and coming into contact with the two electrostatic brushes 20 and 22, and scraping jigs 20B and 22B (scrapers) that scrape off an attachment (such as a toner) having adhered to the collecting rollers 20A and 22A while coming into contact with the two collecting rollers 20A and 22A respectively. The attachment (such as a toner) scrapped off by the scraping jigs 20B and 22B (scrapers) is stored in the electrostatic cleaner 18 (in the housing thereof).

The electrostatic cleaner 18 is provided such that the two electrostatic brushes 20 and 22 face the support rolls 14C and 14D (rolls functioning as opposing rolls of the electrostatic brushes), respectively.

Secondary Transfer Belt

Layer Configuration

The secondary transfer belt may be a single layer consisting of a substrate layer or a laminate, as long as the indentation modulus B and the tensile modulus C are within the ranges described above.

The laminate may be, for example, any of the following laminates 1) to 4).

1) A laminate in which an elastic layer is provided on the outer peripheral surface of a substrate layer,
2) A laminate in which a resin layer and a surface layer are provided on the inner peripheral surface of a substrate layer,
3) A laminate in which a resin layer is provided on the inner peripheral surface of a substrate layer, and
4) A laminate in which an elastic layer and a surface layer are provided on the outer peripheral surface of a substrate layer, and a resin layer is provided on the inner peripheral surface of the substrate layer.

Among the above, the secondary transfer belt is, for example, preferably a laminate including a substrate layer and an elastic layer provided on the outer peripheral surface of the substrate layer, and more preferably a laminate including a substrate layer, an elastic layer provided on the outer peripheral surface of the substrate layer, and a surface layer.

In a case where the layer configuration of the secondary transfer belt is a laminate including the elastic layer (for example, more preferably an elastic layer containing a thermoplastic elastomer), the indentation modulus B and the tensile modulus C of the secondary transfer belt are likely to be adjusted to be within the ranges described above.

Substrate Layer

The aspect of the substrate layer in the secondary transfer belt is the same as the aspect of the substrate layer in the intermediate transfer belt.

Elastic Layer

The elastic layer is configured to contain, for example, an elastic material.

Examples of the elastic material include a rubber material, a thermoplastic elastomer, and the like. One elastic material may be used alone, or two or more elastic materials may be used in combination.

Examples of the rubber material include acrylic rubber, isoprene rubber, chloroprene rubber, epichlorohydrin rubber, butyl rubber, polyurethane rubber, silicone rubber, fluororubber, styrene-butadiene rubber, butadiene rubber, nitrile rubber, ethylene propylene rubber, and epichlorohydrin-ethylene oxide copolymerization rubber, epichlorohydrin-ethylene oxide-allylglycidyl ether ternary copolymerization rubber, ethylene-propylene-diene ternary copolymerization rubber (EPDM), acrylonitrile-butadiene copolymerization rubber (NBR), natural rubber, rubber as a mixture of these, and the like.

For example, from the viewpoint of making the indentation modulus B and the tensile modulus C fall into preferable ranges, it is preferable that the rubber material include at least one of acrylic rubber or butadiene rubber among the above. One rubber material may be used alone, or two or more rubber materials may be used in combination.

Examples of the thermoplastic elastomer include a polyester-based thermoplastic elastomer, a polyamide-based thermoplastic elastomer, a polyether-based thermoplastic elastomer, a polyurethane-based thermoplastic elastomer (hereinafter, also simply called polyurethane), a polyolefin-based thermoplastic elastomer, a styrene-based thermoplastic elastomer, a (meth)acrylic thermoplastic elastomer, a polydiene-based thermoplastic elastomer, a silicone-modified polycarbonate-based thermoplastic elastomer, a fluorine-based copolymer-based thermoplastic elastomer, and the like.

For example, from the viewpoint making the indentation modulus B and the tensile modulus C fall into preferable ranges, it is preferable that the thermoplastic elastomer include at least one of a styrene-based thermoplastic elastomer or a polyurethane-based thermoplastic elastomer among the above. One thermoplastic elastomer may be used alone, or two or more thermoplastic elastomers may be used in combination.

The thermoplastic elastomer refers to, for example, an elastomer that has the properties of rubber at room temperature (25° C.) and has the properties of softening at a high temperature just as the thermoplastic resin.

For example, it is preferable that the elastic material include a thermoplastic elastomer among the above.

That is, for example, the secondary transfer belt preferably has a configuration in which a surface of the secondary transfer belt coming into contact with the outer peripheral surface of the intermediate transfer belt contains a thermoplastic elastomer, and more preferably has a configuration in which the secondary transfer belt is a laminate including a substrate layer and an elastic layer containing a thermoplastic elastomer.

In a case where the secondary transfer belt contains a thermoplastic elastomer, it is easier to increase the breakdown voltage of the secondary transfer belt compared to a case where a rubber material is used, and the belt breakage that occurs in the secondary transfer portion when a high voltage is applied is further reduced. Accordingly, even in a case where images are repeatedly formed, the secondary transfer belt properly stays in contact with the cleaning blade, which further reduces the contamination of the back surface of a recording medium.

The elastic layer may be configured to further contain other materials in addition to the elastic material, such as a foaming agent, a conducting agent, a foaming aid, a foam stabilizer, and a catalyst.

Examples of the foaming agent include water; an azo compound such as azodicarbonamide, azobisisobutyronitrile, or diazoaminobenzene; benzenesulfonyl hydrazides such as benzenesulfonyl hydrazide, 4,4'-oxybisbenzenesulfonylhydrazide, and toluenesulfonyl hydrazide; bicarbonate such as sodium hydrogencarbonate that generates carbon dioxide by pyrolysis; a mixture of $NaNO_2$ and $NH_4Cl$ that generates a nitrogen gas; a peroxide that generates oxygen; and the like.

Examples of the conducting agent include an electron conducting agent and an ion conducting agent. One conducting agent may be used alone, or two or more conducting agents may be used in combination.

Examples of the electron conducting agent include powder of carbon black such as Ketjen black and acetylene black; pyrolytic carbon and graphite; and metals or alloys such as aluminum, copper, nickel, and stainless steel; a conductive metal oxide such as tin oxide, indium oxide, titanium oxide, a tin oxide-antimony oxide solid solution, or a tin oxide-indium oxide solid solution; a substance obtained by performing a conductive treatment on the surface of an insulating material; and the like.

For example, it is preferable that the electron conducting agent include carbon black such as Ketjen black and acetylene black among the above.

The content of the electron conducting agent with respect to 100 parts by mass of the elastic material is, for example, preferably 1 part by mass or more and 40 parts by mass or less, and more preferably 15 parts by mass or more and 35 parts by mass or less.

Examples of the ion conducting agent include a quaternary ammonium salt (for example, a perchlorate, a chlorate, a fluoroborate, a sulfate, an ethosulfate, a benzyl bromide salt, or a benzyl chloride salt of lauryl trimethyl ammonium, stearyl trimethyl ammonium, octadodecyl trimethyl ammonium, dodecyl trimethyl ammonium, hexadecyl trimethyl ammonium, or modified fatty acid·dimethyl ethyl ammonium), an aliphatic sulfonate, a higher alcohol sulfuric acid ester salt, a higher alcohol ethylene oxide-added sulfuric acid ester salt, a higher alcohol phosphoric acid ester salt, a higher alcohol ethylene oxide-added phosphoric acid ester salt, betaine, a higher alcohol ethylene oxide, a polyethylene glycol fatty acid ester, a polyhydric alcohol fatty acid ester, and the like.

The content of the ion conducting agent with respect to 100 parts by mass of the elastic material is, for example, preferably 0.1 parts by mass or more and 5.0 parts by mass or less, and more preferably 0.5 parts by mass or more and 3.0 parts by mass or less.

Examples of other additives include known materials that can be added to the elastic material, such as a softener, a plasticizer, a curing agent, a vulcanizing agent, a vulcanizing accelerator, an antioxidant, a surfactant, a coupling agent, and a filler (such as silica or calcium carbonate).

Formation of Elastic Layer

The method of forming the elastic layer is not particularly limited, and a known method is used.

Examples thereof include a method of preparing a composition that contains an elastic material and other components used as necessary and extrusion-molding the composition into a cylindrical shape, a method of cutting a huge elastic substance into a cylindrical shape, a method of dissolving the composition in a solvent capable of dissolving the composition and performing coating, and the like. After a cylindrical elastic substance is obtained, as necessary, the shape may be further adjusted or a post-treatment such as surface polishing may be performed.

Surface Layer

The surface layer may be, for example, a film or a sheet containing a polymer material.

Examples of the polymer material include the rubber material and the thermoplastic elastomer exemplified above for the elastic layer.

It is preferable that the surface layer contain, for example, polyurethane and fluorine-containing resin particles.

Polyurethane (referring to the polyurethane-based thermoplastic elastomer described above for the elastic layer) is generally synthesized by polymerizing a polyisocyanate and a polyol. It is preferable that the polyurethane have, for example, a hard segment and a soft segment.

Examples of the fluorine-containing resin particles include one kind of particles or two or more kinds of particles consisting of any of a tetrafluoroethylene resin, a chlorotrifluoroethylene resin, a hexafluoropropylene resin, a vinyl fluoride resin, a vinylidene fluoride resin, a dichlorodifluoroethylene resin, and a copolymer of these. Among these, as the fluorine-containing resin particles, for example, tetrafluoroethylene resin particles (for example, polytetrafluoroethylene resin particles) are preferable.

The average primary particle size of the fluorine-containing resin particles is, for example, preferably 10 nm or more and 500 nm or less, more preferably 50 nm or more and 300 nm or less, and even more preferably 80 nm or more and 200 nm or less.

The surface layer may contain additives such as an antioxidant, a crosslinking agent, a flame retardant, a colorant, a surfactant, a dispersant, and a filler.

From the viewpoint of durability of the secondary transfer belt, the average thickness of the surface layer is, for example, preferably 0.1 μm or more, more preferably 0.5 μm or more, and even more preferably 1 μm or more. From the viewpoint of making the indentation modulus B and the tensile modulus C of the secondary transfer belt fall into preferable ranges, the average thickness of the surface layer is, for example, preferably 50 μm or less, more preferably 20 μm or less, and even more preferably 10 μm or less.

Film Thickness of Secondary Transfer Belt

From the viewpoint of mechanical strength of the belt, the total thickness of the secondary transfer belt is, for example, preferably 10 μm or more, more preferably 50 μm or more and 550 μm or less, and even more preferably 80 μm or more and 460 μm or less.

In a case where the secondary transfer belt is a laminate including a substrate layer, from the viewpoint manufacturing suitability and from the viewpoint of suppressing discharge, the thickness of the substrate layer is, for example, preferably 10 μm or more and 150 μm or less, and more preferably 50 μm or more and 140 μm or less.

In a case where the secondary transfer belt is a laminate including an elastic layer, the thickness of the elastic layer is, for example, preferably 50 μm or more and 350 μm or less, and more preferably 50 μm or more and 320 μm or less. In a case where the thickness of the elastic layer is within the above range, even though the secondary transfer belt comes into contact with the intermediate transfer belt, the contact pressure is likely to be reduced. Therefore, the filming phenomenon is unlikely to occur.

The film thickness of each layer in the secondary transfer belt can be measured using the same method as the method of measuring the film thickness of the intermediate transfer belt.

Image Forming Apparatus

Hereinafter, an image forming apparatus including the transfer device according to the present exemplary embodiment will be described.

An image forming apparatus according to the present exemplary embodiment includes a toner image forming device that has an image holder and forms a toner image on a surface of the image holder, and a transfer device that transfers the toner image formed on the surface of the image holder to a surface of a recording medium. As the transfer device, the transfer device according to the present exemplary embodiment described above is used.

Figure 2:
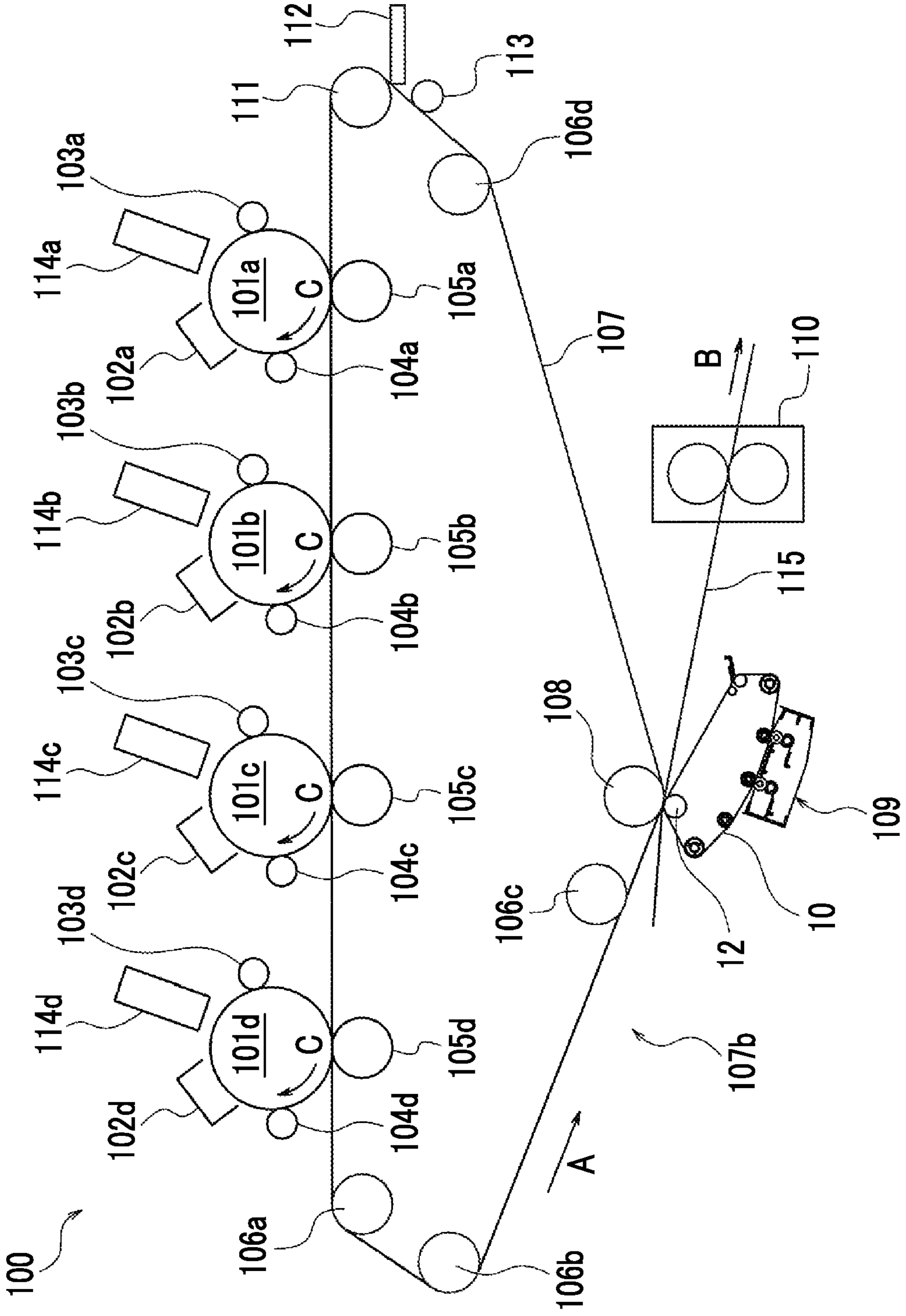
FIG. 2 is a schematic configuration view showing an example of an image forming apparatus according to the present exemplary embodiment.

FIG. 2 is a schematic configuration view showing an example of an image forming apparatus according to the present exemplary embodiment.

An image forming apparatus 100 is, for example, a so-called tandem-type image forming apparatus as shown in FIG. 2, in which around four image holders 101*a* to 101*d* each consisting of an electrophotographic photoreceptor, charging devices 102*a* to 102*d* that charge the surface of the image holders 101*a* to 101*d*, exposure devices 114*a* to 114*d* (an example of electrostatic latent image forming device) that expose the charged surface of the image holders 101*a* to 101*d* to form an electrostatic latent image, developing devices 103*a* to 103*d* that contain a developer containing a toner and develop the electrostatic latent image formed on the surface of the image holders 101*a* to 101*d* to form a toner image, primary transfer devices (primary transfer rolls) 105*a* to 105*d* that transfer the toner image on the image holders 101*a* to 101*d* to the intermediate transfer belt 107, the secondary transfer device 109 that has the secondary transfer belt 10 arranged in contact with the outer peripheral surface of the intermediate transfer belt 107 and performing batch transfer (secondary transfer) of the toner image transferred to the outer peripheral surface of the intermediate transfer belt 107 to the surface of a recording medium (paper K), and image holder-cleaning devices 104*a* to 104*d* are arranged in sequence along the rotation direction thereof.

The image forming apparatus 100 may include a static eliminator for removing the residual potential remaining on the surface of the image holders 101*a* to 101*d* after transfer.

The intermediate transfer belt 107 to which the toner image on the image holders 101*a* to 101*d* is transferred is supported by support rolls 106*a* to 106*d*, a driving roll 111, and an opposing roll 108 to form a belt support device 107*b*. By the support rolls 106*a* to 106*d*, the driving roll 111, and the opposing roll 108, the intermediate transfer belt 107 can move a region interposed between the image holders 101*a* to 101*d* and the primary transfer devices 105*a* to 105*d* in the direction of an arrow A while coming into contact with the surface of each of the image holders 101*a* to 101*d*. The portion where the primary transfer devices 105*a* to 105*d* come into contact with the image holders 101*a* to 101*d* via the intermediate transfer belt 107 is a primary transfer portion, and a primary transfer voltage is applied to the contact portion between the image holders 101*a* to 101*d* and the primary transfer devices 105*a* to 105*d*.

On the downstream side of the primary transfer devices 105*a* to 105*d* in the rotation direction (arrow A) of the intermediate transfer belt 107, the secondary transfer device 109 (secondary transfer device 109 according to the present exemplary embodiment) is arranged on the outer peripheral surface of the intermediate transfer belt 107. Furthermore, the opposing roll 108 is arranged in contact with the inner peripheral surface of the intermediate transfer belt 107 via the secondary transfer belt 10 and the intermediate transfer belt 107, such that the opposing roll 108 faces the secondary transfer device 109 and the secondary transfer roll 12.

The portion where the secondary transfer device 109 (the secondary transfer roll 12 thereof) comes into contact with the opposing roll 108 via the intermediate transfer belt 107 and a secondary transfer belt 116 is a secondary transfer portion, and a secondary transfer voltage is applied to the contact portion where the secondary transfer roll 12 and the opposing roll 108 are in contact with each other via the secondary transfer belt 10.

The secondary transfer device 109 is configured to include the secondary transfer roll 12 (back roll) and the secondary transfer belt 10 that is arranged on the toner image-holding side of the intermediate transfer belt 107 (that is, the outer peripheral surface side of the intermediate transfer belt 107) and performs secondary transfer of the toner image transferred to the outer peripheral surface of the intermediate transfer belt to the surface of a recording medium.

In addition, intermediate transfer belt-cleaning devices 112 and 113 are arranged to come into contact with the outer peripheral surface of the intermediate transfer belt 107 after transfer.

Furthermore, a fixing device 110 is provided that is for fixing the toner image that has passed through the secondary transfer portion and has been transferred to a recording medium 115 such as paper.

Transfer Device

Herein, for example, the unit having the intermediate transfer belt 107, the primary transfer devices 105*a* to 105*d*, the secondary transfer device 109 having the secondary transfer belt, the intermediate transfer belt-cleaning devices 112 and 113, and a roll group including the opposing roll 108 and the like corresponds to the transfer device according to the present exemplary embodiment.

As the intermediate transfer belt 107, a belt-shaped material (intermediate transfer belt) made conductive, such as polyimide, polyamide-imide, polycarbonate, polyarylate, polyester, or rubber, is used.

The opposing roll 108 forms a counter electrode of the secondary transfer roll 12. The layer structure of the opposing roll 108 may be a single layer or a multilayer. For example, in a case where the opposing roll 108 has a single layer structure, the opposing roll 108 is configured with a roll obtained by mixing a proper amount of conductive particles, such as carbon black, with silicone rubber, urethane rubber, EPDM, or the like. In a case where the opposing roll 108 has a double layer structure, the opposing roll 108 is configured with a roll obtained by coating the outer peripheral surface of an elastic layer configured with the aforementioned rubber material with a high-resistivity layer.

Usually, a voltage of 1 kV or more and 6 kV or less is applied to the shaft of the opposing roll 108 and the secondary transfer roll 12. A voltage may be applied not to the shaft of the opposing roll 108, but to an excellently conductive electrode member brought into contact with the opposing roll 108 and the secondary transfer roll 12. Examples of the electrode member include a metal roll, a conductive rubber roll, a conductive brush, a metal plate, a conductive resin plate, and the like.

As the intermediate transfer belt-cleaning devices 112 and 113, in addition to a cleaning blade, a cleaning brush, a cleaning roll, and the like are used. Among these, for example, it is desirable to use a cleaning blade. Examples of the material of the cleaning blade include urethane rubber, neoprene rubber, silicone rubber, and the like.

Hereinafter, other elements of the image forming apparatus 100 according to the present exemplary embodiment will be described.

Image Holder

As the image holders 101*a* to 101*d*, a wide variety of known electrophotographic photoreceptors are used. As the electrophotographic photoreceptors, an inorganic photoreceptor having a photosensitive layer configured with an inorganic material, an organic photoreceptor having a photosensitive layer configured with an organic material, and the like are used. As the organic photoreceptor, a functionally separable organic photoreceptor that is a laminate of a charge generating layer generating charge by exposure and a charge transport layer transporting charge or a single-layered organic photoreceptor that performs a function of generating charge and a function of transporting charge is used. Furthermore, as the inorganic photoreceptor, an inorganic photoreceptor having a photosensitive layer configured with amorphous silicon is used.

The shape of the image holders 101*a* to 101*d* is not particularly limited, and, for example, known shapes such as a cylindrical drum shape, a sheet shape, or a plate shape are adopted.

Charging Device

The charging devices 102*a* to 102*d* are not particularly limited. For example, a wide variety of chargers, such as a contact-type charger using a roller, a brush, a film, a rubber blade, or the like that is conductive (herein, for a charging device, "conductive" means, for example, that a volume resistivity is less than $10^7$ Ω·cm) or semi-conductive (herein, for a charging device, "semi-conductive" means, for example, that a volume resistivity is $10^7$ to $10^{13}$ Ωcm) and a scorotron or corotron charger using corona discharge, are used. Among these, for example, a contact-type charger is desirable.

Although the charging devices 102*a* to 102*d* usually apply a direct current to the image holders 101*a* to 101*d*, alternating currents may be further superimposed and applied to the image holders 101*a* to 101*d*.

Exposure Device

The exposure devices 114*a* to 114*d* are not particularly limited. For example, a wide variety of exposure devices, such as light sources of semiconductor laser light, light emitting diode (LED) light, and liquid crystal shutter light and an optical instrument that can expose the surface of the image holders 101*a* to 101*d* in the shape of an image determined from these light sources via a polygon mirror, are used.

Developing Device

The developing devices 103*a* to 103*d* are selected depending on the purpose. Examples thereof include known developing machines that develop images in a contact manner or a non-contact manner by using a one-component developer or a two-component developer with a brush, a roller, or the like.

The toner (developer) used in the image forming apparatus 100 of the present exemplary embodiment is not particularly limited. The toner is configured to contain, for example, a binder resin and a colorant.

Examples of the binder resin include homopolymers and copolymers such as styrenes, monoolefins, vinyl esters, a-methylene aliphatic monocarboxylic acid esters, vinyl ethers, and vinyl ketones. Particularly, examples of typical binder resins include polystyrene, a styrene-alkyl acrylate copolymer, a styrene-alkyl methacrylate copolymer, a styrene-acrylonitrile copolymer, a styrene-butadiene copolymer, a styrene-maleic anhydride copolymer, polyethylene, polypropylene, and the like. Examples thereof also include polyester, polyurethane, an epoxy resin, a silicone resin, polyamide, modified rosin, paraffin wax, and the like.

Typical examples of the colorant include magnetic powder such as magnetite and ferrite, carbon black, aniline blue, calcoyl blue, chrome yellow, ultramarine blue, dupont oil red, quinoline yellow, methylene blue chloride, phthalocyanine blue, malachite green oxalate, lamp black, Rose Bengal, C. I. Pigment Red 48:1, C. I. Pigment Red 122, C. I. Pigment Red 57:1, C. I. Pigment Yellow 97, C. I. Pigment Yellow 17, C. I. Pigment Blue 15:1, or C. I. Pigment Blue 15:3, and the like.

The toner may be treated such that known additives, such as a charge control agent, a release agent, and other inorganic particles, are added to the interior or exterior of the toner.

Typical examples of the release agent include low-molecular-weight polyethylene, low-molecular-weight polypropylene, Fischer-Tropsch wax, montan wax, carnauba wax, rice wax, candelilla wax, and the like.

As the charge control agent, known charge control agents, such as an azo-based metal complex compound, a metal complex compound of salicylic acid, or a resin-type charge control agent containing a polar group, are used.

As other inorganic particles, for the purpose such as powder fluidity, charge control, or the like, small-size inorganic particles having an average primary particle size of 40 nm or less are used. Furthermore, in order to reduce adhesion, inorganic or organic particles having a diameter larger than the small-size inorganic particles may be used together. Known particles are used as these other inorganic particles.

Treating the surface of the small-size inorganic particles is effective, because then the dispersibility is enhanced, and the powder fluidity is very effectively improved.

As the manufacturing method of a toner, a polymerization method, for example, an emulsion polymerization aggregation method, a dissolution suspension method, or the like, is desirably used because high shape controllability is obtained by these methods. Furthermore, a manufacturing method may be performed in which the toner obtained by these methods is used as a core, and aggregated particles are additionally attached to and heat-fused with the core to make a core/shell structure.

In a case where an external additive is added, the toner can be manufactured by mixing of the toner and the external additive by using a Henschel mixer, a V-blender, or the like. Furthermore, in a case where the toner is manufactured by a wet method, the external additive may be added to the exterior of the toner by a wet method.

Primary Transfer Device

The primary transfer devices 105*a* to 105*d* are configured with transfer rolls. Each of the transfer rolls may be a single layer roll or a multilayer roll. For example, in a case where the transfer roll has a single layer structure, the transfer roll is configured with a roll obtained by mixing a proper amount of conductive particles, such as carbon black, with foamed or non-foamed silicone rubber, urethane rubber, EPDM, or the like.

Image Holder-Cleaning Device

The image holder-cleaning devices 104*a* to 104*d* are for removing the residual toner adhering to the surface of the image holders 101*a* to 101*d* after the primary transfer step. In addition to a cleaning blade, a cleaning brush, a cleaning roll, and the like are used as the image holder-cleaning devices 104*a* to 104*d*. Among these, for example, it is desirable to use a cleaning blade. Examples of the material of the cleaning blade include urethane rubber, neoprene rubber, silicone rubber, and the like.

Fixing Device

As the fixing device 110, for example, a wide variety of known fixing units, such as a thermal roller fixing unit, a pressure roller fixing unit, and a flash fixing unit, are used.

Image Forming Process

In a case where the image forming apparatus 100 forms an image, the image holder 101*a* rotates in the direction of an arrow C, and the surface of the image holder 101*a* is charged by the charging device 102*a*. Then, by the exposure device 114*a* such as laser light, an electrostatic latent image of a first color is formed. By the developing device 103*a* that contains a developer containing a toner corresponding to the color of the electrostatic latent image formed on the surface of the image holder 101*a*, the electrostatic latent image is developed (visualized) with the toner, and a toner image is formed. The developing devices 103*a* to 103*d* each contain toners (for example, yellow, magenta, cyan, and black) corresponding to the electrostatic latent images of each color.

While passing through the primary transfer portion, the toner image formed on the image holder 101*a* is electrostatically transferred (primary transfer) onto the intermediate transfer belt 107 by the primary transfer device 105*a*. Subsequently, the primary transfer devices 105*b* to 105*d* perform primary transfer of the toner images of a second color, a third color, and a fourth color onto the intermediate transfer belt 107 holding the toner image of the first color such that the toner images are sequentially stacked. Finally, a multicolored multi-toner image is obtained.

While passing through the secondary transfer portion, the multi-toner image formed on the intermediate transfer belt 107 is electrostatically batch transferred to the recording medium 115. The recording medium 115 on which the toner image is transferred is transported to the fixing device 110, subjected to a fixing treatment by heating, pressurization, or the like, and then discharged to the outside of the apparatus.

The residual toner on each of the image holders 101*a* to 101*d* after the primary transfer is removed by the image holder-cleaning devices 104*a* to 104*d*, respectively. On the other hand, the residual toner on the intermediate transfer belt 107 after the secondary transfer is removed by the intermediate transfer belt-cleaning devices 112 and 113, such that the intermediate transfer belt 107 can be used in the next image forming process.

In the above exemplary embodiments, a so-called tandem-type image forming apparatus configured with a plurality of image holders is described. However, a so-called multicycle-type (for example, 4-cycle type) image forming apparatus may be used that has one image holder and has an intermediate transfer belt that rotates and performs image forming process by the number of colors.

EXAMPLES

Examples of the present invention will be described below, but the present invention is not limited to the following examples. In the following description, unless otherwise specified, "parts" and "%" are based on mass in all cases.

Example 1

Preparation of Intermediate Transfer Belt

A PI precursor solution is prepared that is obtained by dissolving polyamic acid consisting of a polymer of 3,3',4,4'-biphenyltetracarboxylic acid dianhydride and 4,4'-diaminodiphenyl ether is dissolved in N-methyl-2-pyrrolidone (NMP), there. The PI precursor solution is a solution in which the solid content of a polyimide resin after imidization of the polyamic acid is 18% by mass.

Then, carbon black (FW200: manufactured by Orion Engineered Carbons, average particle size=13 nm) is added to the PI precursor solution such that the amount of carbon black is 23 parts by mass with respect to 100 parts by mass of the solid content of the polyamic acid, followed by mixing and stirring, thereby preparing a PI precursor solution containing dispersed carbon black.

Thereafter, in a state where an aluminum cylinder (φ366) is being rotated, via a dispenser, the PI precursor solution containing dispersed carbon black is jetted at a width of 500 mm to the outer surface of the cylinder.

Next, the cylinder is heated and dried at 140° C. for 30 minutes in a state of being kept horizontal, heated for 120 minutes such that the maximum temperature reaches 320° C., and cut into a belt body having a thickness of 80 μm (that is, a single polyimide resin layer) at a width of 363 mm.

Preparation of Primary Transfer Roll

Formation of Elastic Layer

EP70 (manufactured by INOAC CORPORATION) is used as an elastic foamed substance, and cut into a cylindrical shape having an outer diameter of 26 mm and an inner diameter of 8 mm, thereby obtaining a cylindrical elastic foamed substance.

Formation of Conductive Coating Layer

The elastic foamed substance obtained by the above method is immersed at 20° C. for 10 minutes in a treatment liquid obtained by mixing an aqueous dispersion containing 36% by mass of dispersed carbon black with an acrylic emulsion (manufactured by ZEON CORPORATION, trade name "Nipol LX852") at a mass ratio of 1:1. Then, the elastic foamed substance to which the treatment liquid has adhered is heated and dried for 60 minutes in a curing furnace set to 100° C., such that water is removed and the acrylic resin is crosslinked. On an exposed surface of the elastic foamed substance, a conductive coating layer containing carbon black is formed of the acrylic resin cured by crosslinking. In this way, an elastic layer configured with an elastic foamed substance and a conductive coating layer that coats an exposed surface of the elastic foamed substance is obtained.

Then, a conductive support member (made of SUS, having a diameter of 8 mm) including an adhesive applied to the surface thereof is inserted into the obtained elastic layer, and the surface of the elastic layer is polished, thereby obtaining a primary transfer roll member having an outer diameter of 18.7 mm.

Preparation of Secondary Transfer Belt

Formation of Substrate Layer

As a coating liquid for a substrate layer of a secondary transfer belt, a polyamic acid solution containing dispersed carbon black is prepared as follows. As a conducting agent, carbon black (SPECIAL Black 4, manufactured by Evonik Degussa Japan Co., Ltd.) is added at a mass ratio of solid content of 8% by mass to an N-methyl-2-pyrrolidone (NMP) solution of polyamic acid (UIMIDE KX manufactured by UNITIKA LTD., concentration of solid content 20% by mass) containing biphenyltetracarboxylic acid dianhydride (BPDA) and p-phenylenediamine (PDA), and the obtained solution is subjected to a dispersion treatment using a jet mill disperser (manufactured by GeaNUS: GeanusPY) (200 $N/mm^2$, 5 passes). The obtained polyamic acid solution containing dispersed carbon black is passed through a 20 μm mesh made of stainless steel, thereby removing foreign substances and carbon black aggregates. The solution is also subjected to vacuum defoaming for 15 minutes with stirring to prepare a final solution. The prepared solution is used as a coating liquid for a substrate layer of a secondary transfer belt.

A cylinder having an outer diameter of φ40 mm is prepared.

In a state where the cylinder is being rotated, the outer surface of the cylinder is coated with the coating liquid for a substrate layer of a secondary transfer belt by spiral coating. Then, the cylinder is dried at 90° C. for 30 minutes in a state of being kept horizontal, and then the coating film is heated at 320° C. for 2 hours to cause an imidization reaction (baking), thereby forming a substrate layer having a length of 350 mm and a film thickness of 60

Formation of Elastic Layer (A)

A styrene-based thermoplastic elastomer manufactured by Asahi Kasei Corporation. (100 parts by mass, TUFTEC H1221) and 30 parts by mass of carbon black (SPECIAL Black 4, manufactured by Evonik Degussa Japan Co., Ltd.) as a conducting agent are kneaded together by a twin-screw extruder and then subjected to extrusion molding, thereby preparing a tube (outer diameter 50 mm, inner diameter 40.0 mm). A substrate layer is bonded to the inside of the obtained tube by using a conductive adhesive. Then, the surface thereof is subjected to traverse polishing using a cylindrical polishing machine and then to mirror polishing as finish-up polishing. In this way, an elastic layer having a thickness of 240 μm is formed on the surface layer.

Formation of Surface Layer

A curing agent (LOCTITE WH-1, Henkel Japan Ltd., 1% by mass) is added to a urethane resin (BONDERITE T862A, Henkel Japan Ltd.) containing fluorine-containing resin particles (PTFE, polytetrafluoroethylene), and the mixture is diluted with water to adjust the amount of PTFE to 10% by mass. The obtained liquid is adopted as a coating liquid for a surface layer.

The central axis of a substrate A is aligned in a horizontal direction, and the substrate A is rotated. In this state, the coating liquid is sprayed on the outer peripheral surface of the substrate A. Then, the substrate A is dried with hot air at a temperature of 150° C. for 35 minutes, thereby forming a surface layer on the surface of an elastic layer. The average thickness of the surface layer is adjusted to 3 thereby obtaining a secondary transfer belt.

Example 2

A transfer device is obtained by the same preparation method as in Example 1, except that the substrate layer is changed to a substrate layer (B) having the following specifications in preparing the secondary transfer belt described in Example 1.

Formation of Substrate Layer (B)

Printex 150T (organic volatile content 10% at pH 4, DBP oil absorption 150 ml/100 g, manufactured by Degussa AG) is used as acidic carbon black, and PETG 6763 (manufactured by Eastman Chemical Company) that is an amorphous polyester resin is used as a polyester resin as a matrix resin. In a nitrogen atmosphere, the carbon black is heated at 80° C. for 60 minutes to remove moisture having adhered to the carbon black. Then, 35 parts by mass of the acidic carbon black and 0.5 parts by mass of RIKESTER EW-90 (RIKEN VITAMIN Co., Ltd.) as a lubricant are added to 100 parts by mass of the polyester resin, and the mixture is kneaded and dispersed for 20 minutes at a set temperature of 150° C. by using a pressurizing kneader.

The kneaded material is cut in the form of a sheet shape by using two rolls and made into powder by using a pulverizer, thereby manufacturing an amorphous polyester resin composition containing finely dispersed acidic carbon black.

By using a single-screw extruder, the resin composition is extrusion-molded in the form of a tube at a heating temperature of 240° C., thereby forming an endless substrate layer having a thickness of 0.13 mm, a width of 350 mm, and an inner diameter of 40 mm.

Example 3

A transfer device is obtained by the same preparation method as in Example 1, except that the elastic layer is changed to an elastic layer (B) having the following specifications in preparing the secondary transfer belt described in Example 1.

Preparation of Elastic Layer (B)

A polyurethane-based thermoplastic elastomer (manufactured by BASF Japan Ltd., ELASTURAN (registered trademark) ET870-11V, 100 parts by mass) and 30 parts by mass of carbon black (SPECIAL Black 4, manufactured by Evonik Degussa Japan Co., Ltd.) as a conducting agent are kneaded together by a twin-screw extruder and then subjected to extrusion molding, thereby preparing a tube (outer diameter 50.0 mm, inner diameter 40.0 mm).

A substrate layer is bonded to the inside of the obtained tube by using a conductive adhesive. Then, the surface thereof is subjected to traverse polishing using a cylindrical polishing machine and then to mirror polishing as finish-up polishing, thereby obtaining a secondary transfer belt.

Example 4

A transfer device is obtained by the same preparation method as in Example 2, except that the elastic layer is changed to the aforementioned elastic layer (B) in preparing the secondary transfer belt described in Example 2.

Comparative Example 1

A transfer device is obtained according to the same specifications as in Example 1 (that is, by forming the same surface layer as in Example 1 on an elastic layer (C), and the like), except that a secondary transfer belt including the following elastic layer (C) is adopted without using a substrate layer.

Preparation of Elastic Layer (C)

The following materials are kneaded using a twin-screw kneader. The obtained kneaded material is dissolved in methyl isobutyl ketone, thereby obtaining a coating liquid for an elastic layer as a 35% solution.

- Acrylic rubber (NIPOL AR12, manufactured by ZEON CORPORATION.): 100 parts
- Stearic acid (STEARIC ACID CAMELLIA. Beads, NOF CORPORATION.): 1 part
- Red phosphorus (NOVA EXCEL 140F, manufactured by RIN KAGAKU KOGYO Co., Ltd.): 10 parts
- Aluminum hydroxide (HEIDILITE H42M, manufactured by SHOWA DENKO K.K.): 60 parts
- Hexamethylenediamine carbamate (Diak.No1, manufactured by DUPONT DOW ELASTOMERS JAPAN): 0.6 parts
- Crosslinking accelerator (VULCOFACACT 55, mixture of salt of 70% 1,8-diazabicyclo(5,4,0)undecene-7 and dibasic acid and 30% amorphous silica, manufactured by Safic-Alcan SAS): 1 part
- Tetrabutylammonium perchlorate (QAP-01, manufactured by Japan Carlit Co., Ltd.): 0.3 parts In a state where a cylindrical mold having an outer diameter of 40 mm is being rotated, the aforementioned coating liquid for an elastic layer is jetted from a nozzle to the mold such that the mold is spirally coated with the coating liquid for an elastic layer at a width of 400 mm. The coating amount is set such that an elastic layer having a film thickness of 500 μm is formed, and heating is performed at 170° C. for 3 hours, thereby forming an elastic layer having a thickness of 500 μm. The surface of the obtained elastic layer is polished and cut to have a width of 355 mm, thereby forming the elastic layer (C) having an inner diameter of 40 mm, a thickness of 450 μm, and a width of 355 mm.

Comparative Example 2

A transfer device is obtained by the same preparation method as in Comparative Example 1, except that the film thickness of each of the elastic layer (C) and the surface layer is changed to the values shown in Table 1.

Comparative Example 3

A transfer device is obtained by the same preparation method as in Example 1, except that an elastic layer and a surface layer are not used for the secondary transfer belt described in Example 1, and the film thickness of the substrate layer is changed to the value described in Table 1.

Comparative Example 4

A transfer device is obtained by the same preparation method as in Comparative Example 3, except that the intermediate transfer belt described in Comparative Example 3 is replaced with the following intermediate transfer belt <B>.

Preparation of Intermediate Transfer Belt <B>

As a conducting agent, carbon black (trade name: SPECIAL Black 4, manufactured by Degussa-Hüls AG) is mixed with a polyamide-imide solution (manufactured by Hitachi Chemical Company, Ltd., HPC-9000, solvent: N-methylpyrrolidone) having a viscosity of 30 Pa·s at 25° C., in an amount of 30 parts by mass at a mass ratio of solid content. Then, the mixture is dispersed with a counter-collision type disperser, and 5,000 ppm of a surfactant (trade name: LS009, manufactured by Kusumoto Chemicals, Ltd.) is added thereto, thereby obtaining a polyamide-imide coating liquid.

Thereafter, in a state where an aluminum cylinder (φ366) is being rotated, via a dispenser, the polyamide-imide coating liquid is jetted at a width of 500 mm to the outer surface of the cylinder. Next, the cylinder is heated and dried at 170° C. for 15 minutes in a state of being kept horizontal, then baked at 200° C. for 80 minutes, and cut into a belt body having a thickness of 80 μm (that is, a single polyamide-imide layer) at a width of 363 mm.

Comparative Example 5

A transfer device is obtained by the same preparation method as in Example 1, except that in preparing the intermediate transfer belt described in Example 1, the coating liquid for an elastic layer used for preparing the elastic layer (C) described in Comparative Example 1 is used on the substrate layer having a thickness of 80 μm (that is, a single polyimide layer), and the film thickness of the elastic layer is changed to 120 μm by the same preparation method.

Example 5

A transfer device is obtained by the same preparation method as in Example 1, except that in preparing the intermediate transfer belt described in Example 1, the carbon black content is changed to the amount shown in the table.

Example 6

An intermediate transfer belt is obtained by the same method as in Comparative Example 4, except that the carbon black content in the intermediate transfer belt is changed to the amount shown in Table 1. The intermediate transfer belt is combined with the secondary transfer belt described in Example 4, thereby obtaining a transfer device.

Example 7

A transfer device is obtained by the same preparation method as in Example 1, except that the secondary transfer belt described in Example 1 is configured such that the secondary transfer belt has no surface layer.

Examples 8 and 9

A transfer device is obtained according to the specifications in which the film thickness of the substrate of the secondary transfer belt described in Example 1 is adjusted to the value described in Table 1, and the elastic layer <C> described in Comparative Example 1 is used as an elastic layer.

Example 10

The film thickness of the elastic layer of the secondary transfer belt described in Example 2 is adjusted to the value described in Table 1, thereby obtaining a transfer device.

Example 11

The film thickness of each of the substrate layer and the elastic layer of the secondary transfer belt described in Example 3 is adjusted to the value described in Table 1, thereby obtaining a transfer device.

Example 12

A transfer device is obtained by the same preparation method as in Example 1, except that the elastic layer of the secondary transfer belt described in Example 1 is changed to the following elastic layer (D).

Preparation of Elastic Layer (D)

The following compounds are kneaded using a twin-screw kneader. The obtained compound is dissolved in cyclohexanone to prepare a 35% solution, thereby obtaining a coating liquid for an elastic layer.

Acrylonitrile butadiene rubber (NBR) (NIPOL DN101 (manufactured by ZEON CORPORATION.): 100 parts Resin crosslinking agent (SUMILITE RESIN PR-11078 (manufactured by Sumitomo Bakelite Co., Ltd.): 10 parts Stearic acid (STEARIC ACID CAMELLIA. Beads, NOF CORPORATION.): 1 part Aluminum hydroxide (HEIDILITE H42M, manufactured by SHOWADENKO K.K.): 60 parts In a state where a cylindrical mold having an outer diameter of 40 mm is being rotated, the coating liquid for an elastic layer is jetted from a nozzle to the mold such that the mold is spirally coated with the coating liquid for an elastic layer at a width of 400 mm. The coating amount is set such that an elastic layer having a film thickness of 300 μm is formed, and heating is performed at 170° C. for 3 hours, thereby forming an elastic layer having a thickness of 300 μm. The surface of the obtained elastic layer is polished and cut to have a width of 355 mm, thereby forming the elastic layer (D) having an inner diameter of 40 mm, a thickness of 200 μm, and a width of 355 mm.

Example 13

The intermediate transfer belt of the transfer device described in Example 2 is changed to the intermediate transfer belt described in Example 4, thereby obtaining a transfer device.

Evaluation

Preparation of Image Forming Apparatus

The transfer device of each example is incorporated into a transfer device of a modified image forming apparatus "ApeosProC810 manufactured by FUJIFILM Business Innovation Corp.", thereby obtaining an image forming apparatus of each example.

Evaluation of Back Surface Contamination of Recording Medium

By using the image forming apparatus of each example, a 100% solid K image is printed on one side of 10,000 sheets of plain A3 paper. Then, the 10,001st printed paper is visually observed to check back surface contamination, and the contamination of the back surface of the printed paper is evaluated based on the following standard. The results are shown in Table 2.

G1: The back surface is not contaminated.

G2: Although the back surface is found to be slightly contaminated, the contamination is within an acceptable range.

G3: The back surface is found to have streak-like image defects.

G4: The back surface is found to have thick streak-like image defects.

Evaluation of Breaking Durability of Intermediate Transfer Belt

For the image forming apparatus of each example, the number of operation cycles repeated until belt breakage occurs in the intermediate transfer belt is evaluated. Specifically, the number of rotation in which the intermediate transfer belt makes one revolution is counted as one cycle, and the number of cycles repeated until breakage occurs is defined as the number of breaking cycles. The results are shown in Table 2.

G1: 1,000 kcycle or more

G2: 500 kcycle or more

G3: Less than 500 kcycle

Evaluation of Breaking Durability of Secondary Transfer Belt

By using the image forming apparatus of each example, a 100% solid K image is printed on one side of 400,000 sheets of plain A3 paper. Then, the secondary transfer belt is taken out of the transfer device in the image forming apparatus, and the broken portion in each layer, that is, the way the cracks occur is observed with a microscope and evaluated based on the following standard. The results are shown in Table 2.

G1: No cracks occur in the entire layer

G2: Although small cracks have occurred in a part of any of layers, the cracks are within an acceptable range.

G3: Although large cracks have occurred in a part of any of layers, but the belt is not broken.

G4: The belt is broken.

Evaluation of Cleanliness of Intermediate Transfer Belt

The specifications of the power supply in the image forming apparatus of each example are modified (the specifications are modified such that the power supply roll of the secondary transfer portion is disconnected from the power supply built in the main body of the apparatus to be evaluated, and connected to an external power supply (MODEL 610D manufactured by TRek) to make it possible for a voltage to be directly applied to the power supply roll from the outside). In this way, the transfer voltage that is applied from the external power supply to the power supply roll at the time of printing is set to 0 kV.

A solid Cyan image (100% density) is printed on one side of plain A3 paper, the intermediate transfer belt is cleaned with a blade as though the toner is substantially not transferred to the intermediate transfer belt, the residual toner on the cleaned intermediate transfer belt is transferred to a transparent cellophane tape, and the tape is stuck to blank paper. The residual toner is visually observed and evaluated according to the following standard. The results are shown in Table 2.

G1: There is no residual toner.

G2: There is some residual toner (acceptable level).

G3: The toner remains apparently (exceeding the allowable level).

Evaluation of Pressure Resistance of Secondary Transfer Belt

By using the apparatus for evaluation used for evaluating the cleanliness of the intermediate transfer belt, a pressure resistance test is performed by applying a voltage of 10 kV from an external power supply for 7 hours and then observing the surface of the secondary transfer belt. The secondary transfer belt is evaluated based on the following standard. The results are shown in Table 2.

G1: No discharge craters have occurred.

G2: The secondary transfer belt has discharge craters but does not have through holes.

G3: The secondary transfer belt has discharge craters and through holes.

TABLE 1

| | Intermediate transfer belt | | | | Secondary transfer belt | | |
|---|---|---|---|---|---|---|---|
| | Indentation Young's modulus [MPa] | Thickness [μm] | Material of outer peripheral surface | Amount of conducting agent [% by mass] | Indentation Young's modulus [MPa] | Tensile Young's modulus [MPa] | A − B [MPa] |
| Example 1 | 6,000 | 80 | Polyimide | 23 | 59 | 1,500 | 5,941 |
| Example 2 | 6,000 | 80 | Polyimide | 23 | 59 | 270 | 5,941 |
| Example 3 | 6,000 | 80 | Polyimide | 23 | 64 | 1,500 | 5,936 |
| Example 4 | 6,000 | 80 | Polyimide | 23 | 64 | 300 | 5,936 |
| Comparative Example 1 | 6,000 | 80 | Polyimide | 23 | 221 | 10 | 5,779 |
| Comparative Example 2 | 6,000 | 80 | Polyimide | 23 | 315 | 3 | 5,685 |
| Comparative Example 3 | 6,000 | 80 | Polyimide | 23 | 6,000 | 3,000 | 0 |
| Comparative Example 4 | 7,800 | 80 | Polyamide-imide | 30 | 6,000 | 3,000 | 1,800 |
| Comparative Example 5 | 222 | 200 | Acrylic rubber | 35 | 40 | 284 | 182 |
| Example 5 | 5,200 | 80 | Polyimide | 20 | 59 | 1,500 | 5,141 |
| Example 6 | 6,800 | 80 | Polyamide-imide | 25 | 64 | 300 | 6,736 |
| Example 7 | 6,000 | 80 | Polyimide | 23 | 8 | 1,500 | 5,992 |
| Example 8 | 6,000 | 80 | Polyimide | 23 | 280 | 1,800 | 5,720 |
| Example 9 | 6,000 | 80 | Polyimide | 23 | 221 | 1,650 | 5,779 |
| Example 10 | 6,000 | 80 | Polyimide | 23 | 80 | 250 | 5,920 |
| Example 11 | 6,000 | 80 | Polyimide | 23 | 70 | 3,500 | 5,930 |
| Example 12 | 6,000 | 80 | Polyimide | 23 | 230 | 1,800 | 5,770 |
| Example 13 | 7,800 | 80 | Polyamide-imide | 30 | 59 | 270 | 7,741 |

TABLE 1-continued

| | Secondary transfer belt | | | | | | |
|---|---|---|---|---|---|---|---|
| | Total thickness of belt [μm] | Material of substrate layer | Thickness of substrate layer [μm] | Material of elastic layer | Thickness of elastic layer [μm] | Presence of absence of surface layer | Thickness of surface layer [μm] |
| Example 1 | 303 | Polyimide | 60 | Styrene-based thermoplastic elastomer | 240 | Present | 3 |
| Example 2 | 373 | Polyester | 130 | Styrene-based thermoplastic elastomer | 240 | Present | 3 |
| Example 3 | 303 | Polyimide | 60 | Polyurethane-based thermoplastic elastomer | 240 | Present | 3 |
| Example 4 | 373 | Polyester | 130 | Polyurethane-based thermoplastic elastomer | 240 | Present | 3 |
| Comparative Example 1 | 403 | N/A | 0 | Acrylic rubber | 400 | Present | 3 |
| Comparative Example 2 | 455 | N/A | 0 | Acrylic rubber | 450 | Present | 5 |
| Comparative Example 3 | 83 | Polyimide | 80 | N/A | 0 | Present | 3 |
| Comparative Example 4 | 83 | Polyimide | 80 | N/A | 0 | Present | 3 |
| Comparative Example 5 | 303 | Polyimide | 60 | Styrene-based thermoplastic elastomer | 240 | Present | 3 |
| Example 5 | 303 | Polyimide | 60 | Styrene-based thermoplastic elastomer | 240 | Present | 3 |
| Example 6 | 373 | Polyester | 130 | Polyurethane-based thermoplastic elastomer | 240 | Present | 3 |
| Example 7 | 300 | Polyimide | 60 | Styrene-based thermoplastic elastomer | 240 | Absent | 0 |
| Example 8 | 533 | Polyimide | 80 | Acrylic rubber | 450 | Present | 3 |
| Example 9 | 453 | Polyimide | 60 | Acrylic rubber | 450 | Present | 3 |
| Example 10 | 383 | Polyester | 130 | Styrene-based thermoplastic elastomer | 250 | Present | 3 |
| Example 11 | 153 | Polyimide | 100 | Polyurethane-based thermoplastic elastomer | 50 | Present | 3 |
| Example 12 | 263 | Polyimide | 60 | Butadiene | 200 | Present | 3 |
| Example 13 | 373 | Polyester | 130 | Styrene-based thermoplastic elastomer | 240 | Present | 3 |

TABLE 2

| | Evaluation | | | | |
|---|---|---|---|---|---|
| | Back surface contamination of recording medium | Breaking durability of intermediate transfer belt | Breaking durability of secondary transfer belt | Cleanliness of intermediate transfer belt | Pressure resistance of secondary transfer belt |
| Example 1 | G1 | G1 | G1 | G1 | G1 |
| Example 2 | G1 | G1 | G1 | G1 | G1 |
| Example 3 | G1 | G1 | G1 | G1 | G1 |
| Example 4 | G1 | G1 | G1 | G1 | G1 |
| Comparative Example 1 | G3 | G3 | G4 | G1 | G3 |
| Comparative Example 2 | G3 | G1 | G4 | G1 | G3 |
| Comparative Example 3 | G4 | G1 | G1 | G1 | G1 |
| Comparative Example 4 | G4 | G2 | G1 | G1 | G1 |
| Comparative Example 5 | G3 | G3 | G1 | G3 | G1 |

TABLE 2-continued

| | Evaluation | | | | |
|---|---|---|---|---|---|
| | Back surface contamination of recording medium | Breaking durability of intermediate transfer belt | Breaking durability of secondary transfer belt | Cleanliness of intermediate transfer belt | Pressure resistance of secondary transfer belt |
| Example 5 | G1 | G1 | G1 | G2 | G1 |
| Example 6 | G2 | G2 | G1 | G1 | G1 |
| Example 7 | G2 | G1 | G2 | G1 | G2 |
| Example 8 | G2 | G1 | G2 | G1 | G1 |
| Example 9 | G2 | G1 | G2 | G1 | G1 |
| Example 10 | G1 | G1 | G2 | G1 | G1 |
| Example 11 | G1 | G1 | G3 | G1 | G1 |
| Example 12 | G1 | G1 | G2 | G1 | G2 |
| Example 13 | G1 | G2 | G1 | G1 | G1 |

As shown in Tables 1 and 2, it has been found that the transfer devices of examples further reduce the contamination of the back surface of paper, compared to the transfer devices of comparative examples. Furthermore, it has been found that the transfer devices of examples are excellent in breaking durability of the intermediate transfer belt, breaking durability of the secondary transfer belt, and cleanliness of the intermediate transfer belt.

(((1))) A transfer device comprising:

an intermediate transfer belt that has an outer peripheral surface to which a toner image is to be transferred;

a primary transfer device that has a primary transfer member performing primary transfer of a toner image formed on a surface of an image holder to the outer peripheral surface of the intermediate transfer belt; and a secondary transfer device that has a secondary transfer belt arranged in contact with the outer peripheral surface of the intermediate transfer belt and performing secondary transfer of the toner image transferred to the outer peripheral surface of the intermediate transfer belt to a surface of a recording medium, wherein the intermediate transfer belt has an indentation modulus A of 5,000 MPa or more, and the secondary transfer belt has an indentation modulus B of 300 MPa or less and a tensile modulus C of 250 MPa or more.

(((2))) A transfer device comprising:

an intermediate transfer belt that has an outer peripheral surface to which a toner image is to be transferred;

a primary transfer device that has a primary transfer member performing primary transfer of a toner image formed on a surface of an image holder to the outer peripheral surface of the intermediate transfer belt; and a secondary transfer device that has a secondary transfer belt arranged in contact with the outer peripheral surface of the intermediate transfer belt and performing secondary transfer of the toner image transferred to the outer peripheral surface of the intermediate transfer belt to a surface of a recording medium, wherein the secondary transfer belt has a tensile modulus C of 250 MPa or more, an indentation modulus A (MPa) of the intermediate transfer belt is larger than an indentation modulus B of the secondary transfer belt, and a difference between the indentation modulus A and the indentation modulus B (A-B) is 5,000 MPa or more and 7,500 MPa or less.

(((3))) The transfer device according to (((1))) or (((2))), wherein the indentation modulus A of the intermediate transfer belt is 5,000 MPa or more and 6,700 MPa or less.

(((4))) The transfer device according to any one of (((1))) to (((3))), wherein the indentation modulus B of the secondary transfer belt is 10 MPa or more and 300 MPa or less.

(((5))) The transfer device according to (((4))), wherein the indentation modulus B of the secondary transfer belt is 10 MPa or more and 100 MPa or less.

(((6))) The transfer device according to any one of (((1))) to (((5))), wherein the tensile modulus C of the secondary transfer belt is 250 MPa or more and 3,000 MPa or less.

(((7))) The transfer device according to any one of (((1))) to (((6))), wherein the outer peripheral surface of the intermediate transfer belt to which the toner image is to be transferred is configured to contain polyimide.

(((8))) The transfer device according to any one of (((1))) to (((7))), wherein a surface of the secondary transfer belt that comes into contact with the outer peripheral surface of the intermediate transfer belt is configured to contain a thermoplastic elastomer.

(((9))) An image forming apparatus comprising:

a toner image forming device that has an image holder and forms a toner image on a surface of the image holder; and the transfer device according to any one of (((1))) to (((8))) that is a transfer device transferring the toner image formed on the surface of the image holder to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transfer device comprising:

an intermediate transfer belt that has an outer peripheral surface to which a toner image is to be transferred;

a primary transfer device that has a primary transfer member performing primary transfer of a toner image formed on a surface of an image holder to the outer peripheral surface of the intermediate transfer belt; and a secondary transfer device that has a secondary transfer belt arranged in contact with the outer peripheral surface of the intermediate transfer belt and performing secondary transfer of the toner image transferred to the outer peripheral surface of the intermediate transfer belt to a surface of a recording medium, wherein the intermediate transfer belt has an indentation modulus A of 5,000 MPa or more, and the secondary transfer belt has an indentation modulus B of 300 MPa or less and a tensile modulus C of 250 MPa or more.

2. A transfer device comprising:

an intermediate transfer belt that has an outer peripheral surface to which a toner image is to be transferred;

a primary transfer device that has a primary transfer member performing primary transfer of a toner image formed on a surface of an image holder to the outer peripheral surface of the intermediate transfer belt; and a secondary transfer device that has a secondary transfer belt arranged in contact with the outer peripheral surface of the intermediate transfer belt and performing secondary transfer of the toner image transferred to the outer peripheral surface of the intermediate transfer belt to a surface of a recording medium, wherein the secondary transfer belt has a tensile modulus C of 250 MPa or more, an indentation modulus A (MPa) of the intermediate transfer belt is larger than an indentation modulus B of the secondary transfer belt, and a difference between the indentation modulus A and the indentation modulus B (A-B) is 5,000 MPa or more and 7,500 MPa or less.

3. The transfer device according to claim 1, wherein the indentation modulus A of the intermediate transfer belt is 5,000 MPa or more and 6,700 MPa or less.

4. The transfer device according to claim 2, wherein the indentation modulus A of the intermediate transfer belt is 5,000 MPa or more and 6,700 MPa or less.

5. The transfer device according to claim 1, wherein the indentation modulus B of the secondary transfer belt is 10 MPa or more and 300 MPa or less.

6. The transfer device according to claim 2, wherein the indentation modulus B of the secondary transfer belt is 10 MPa or more and 300 MPa or less.

7. The transfer device according to claim 5, wherein the indentation modulus B of the secondary transfer belt is 10 MPa or more and 100 MPa or less.

8. The transfer device according to claim 6, wherein the indentation modulus B of the secondary transfer belt is 10 MPa or more and 100 MPa or less.

9. The transfer device according to claim 1, wherein the tensile modulus C of the secondary transfer belt is 250 MPa or more and 3,000 MPa or less.

10. The transfer device according to claim 2, wherein the tensile modulus C of the secondary transfer belt is 250 MPa or more and 3,000 MPa or less.

11. The transfer device according to claim 1, wherein the outer peripheral surface of the intermediate transfer belt to which the toner image is to be transferred is configured to contain polyimide.

12. The transfer device according to claim 2, wherein the outer peripheral surface of the intermediate transfer belt to which the toner image is to be transferred is configured to contain polyimide.

13. The transfer device according to claim 1, wherein a surface of the secondary transfer belt that comes into contact with the outer peripheral surface of the intermediate transfer belt is configured to contain a thermoplastic elastomer.

14. The transfer device according to claim 2, wherein a surface of the secondary transfer belt that comes into contact with the outer peripheral surface of the intermediate transfer belt is configured to contain a thermoplastic elastomer.

15. An image forming apparatus comprising:

a toner image forming device that has an image holder and forms a toner image on a surface of the image holder; and the transfer device according to claim 1 that is a transfer device transferring the toner image formed on the surface of the image holder to a surface of a recording medium.

16. An image forming apparatus comprising:

a toner image forming device that has an image holder and forms a toner image on a surface of the image holder; and the transfer device according to claim 2 that is a transfer device transferring the toner image formed on the surface of the image holder to a surface of a recording medium.

* * * * *